United States Patent [19]

Hart et al.

[11] 4,190,696

[45] Feb. 26, 1980

[54] FLAME RESISTANT, GAS RESISTANT FOAM MATERIAL

[75] Inventors: John A. Hart, Kanata; Rolland P. Fuoco, Hull, both of Canada

[73] Assignee: Her Majesty the Queen in right of Canada, as represented by the Minister of National Defence, Canada

[21] Appl. No.: 958,495

[22] Filed: Nov. 7, 1978

[30] Foreign Application Priority Data

Dec. 30, 1977 [CA] Canada .................................. 294163

[51] Int. Cl.$^2$ ............................ B05D 5/00; B32B 3/26
[52] U.S. Cl. ........................................... 428/306; 2/2; 428/311; 428/323; 428/921; 521/55; 521/906
[58] Field of Search .............. 428/921, 311, 323, 408, 428/276, 306, 304; 2/2; 521/55, 906

[56] References Cited

U.S. PATENT DOCUMENTS

| | | | |
|---|---|---|---|
| 2,984,584 | 5/1961 | Glarum et al. | 428/244 |
| 3,131,115 | 4/1964 | Robitschek et al. | 428/921 |
| 3,238,056 | 1/1966 | Pall et al. | 428/338 |
| 3,586,596 | 6/1971 | Ainsworth et al. | 428/321 |
| 3,966,521 | 6/1976 | Patton, Jr. et al. | 428/311 |
| 4,045,609 | 8/1977 | Hart | 428/311 |
| 4,099,943 | 7/1978 | Fischman et al. | 428/311 |

*Primary Examiner*—William J. Van Balen
*Attorney, Agent, or Firm*—Cushman, Darby & Cushman

[57] ABSTRACT

The invention disclosed relates to fire-resistant foam materials which are resistant to the passage therethrough of noxious chemicals in liquid or vapor form. The foam material includes an adsorbent material dispersed therein, an organic binder for the foam and a fire-retardant. The binder and fire-retardant are free of any substances which substantially de-activate the adsorbent.

20 Claims, No Drawings

FLAME RESISTANT, GAS RESISTANT FOAM MATERIAL

This invention relates to cellular resin foam materials which are resistant to the passage of noxious undesirable chemicals in the form of liquids, condensible vapour and gases, but which are relatively permeable to air and water vapour. More particularly, the invention relates to the fire-proofing of such materials.

For protection against noxious chemicals such as the gases and smokes employed in chemical warfare, and also against dangerous chemicals such as industrial poisons and pesticides which are generally in the form of sprays or mists, it is customary to use protective equipment and in particular protective clothing which incorporates a gas and vapour adsorbent material.

The prerequisites of an ideal gas-proofed material, in particular for use as wearing apparel, are as follows: The material should be such that it adsorbs a relatively large portion of noxious chemicals such as chemical warfare agents while retaining permeability to oxygen or air; the supporting material for the adsorbent should be substantially porous in order to permit perspiration or other liquids to evaporate from the wearer's body; the material comprising the support should substantially retain its flexibility after being combined with the gas adsorbent; and the gas adsorbent should be substantially permanently bound to the supporting material in order to prevent the adsorbent from becoming dislodged from the support by rain, laundering or rough usage or by the softening effect of moisture and perspiration. Finally the gas-proofed material should be capable of reuse after decontamination.

Garments have been provided which are made from fabric which is sufficiently permeable to air and water vapour to permit their use by humans with some degree of comfort for a reasonable period and at the same time provide protection from the undesirable effects of noxious chemicals such as chemical warfare agents. Such garments are described, for example, in British Pat. No. 575,379 issued Feb. 15, 1946 to Kingan, and U.S. Pat. No. 2,984,584 issued May 16, 1961 to Glarum. In these patents woven and non-woven fabrics are impregnated with an adsorbent such as finely divided carbon which is held in place on the textile fibres by a polymeric binder.

In U.S. Pat. No. 3,238,056 which issued on Mar. 1, 1966 to D. B. Pall et al., disclosed is a filter element which has the purpose of physically removing particulate material from liquid and gaseous medium. The separation is effected purely on a physical basis and is determined by the size of the pores in the filter element. As it stated in Pall et al, conventional filters of normal porosity have pores ranging up to 150 Mu or more. The object of the invention of Pall et al is to incorporate into the pores of conventional filters, fibres or granules which are of a size small enough to enter the pores and to reduce the pores in size to less than 25 Mu in diameter. Thus, Pall et al for its purpose is merely concerned with the physical presence of inter alia the particulate material in reducing the size of the pores and inherently in reducing the size of the pores it is an object of Pall et al to reduce the permeability of the filter element as much as possible to the passage of inter alia gases.

Further, in the disclosure of Pall et al, he states that the filter medium may be any porous material whose pores extend from surface to surface and in a long list of such materials, he specifies foamed polyurethane. Further, in referring to impregnated material used to reduce the size of the pores, Pall et al prefers fibrous material although he states that you can use particulate material and then goes into a long list of particulate materials that can be used and includes within his list diatomaceous earth, Fuller's earth and activated carbon. It is thus clear that all that is being used in the Pall et al invention is the physical presence of these materials rather than any coincident requirement of their activity as adsorbents.

Pall et al further state that the particulate material may be bonded into the pores of the substrate using an organic binder and proceed to give a list of organic binders which may be useful. Further, in the preparation of the foam, Pall et al state that a dispersing agent may be used to form a dispersion of the particulate material in the liquid. However, Pall et al gives no indication or inference that the organic binder must be substantially free from substances which substantially deactivate the adsorbent. It is emphasized that organic binders in general are polymeric materials as can be readily seen from the list given in column 6, lines 42 to 56 of Pall et al. These binders, particularly when obtained from chemical sources, may contain substances which deactivate the adsorbent material and in particular may contain substantial amounts of impurities, low molecular weight polymer processing additives and plasticizers which would deactivate the adsorbent material.

In Canadian Pat. No. 878,560 of J. A. Hart, issued Aug. 17, 1971, an air and water vapour permeable open cell solid resin foam resistant to passage therethrough of noxious chemicals in liquid or vapour form, in which there is dispersed a particulate adsorbent material for said noxious chemicals, and laminated fabric materials, e.g. in the form of protective clothing, incorporating said foam, are described. The particulate adsorbent material is bonded in said foam by an organic binder which is substantially free from substances which would substantially deactivate the adsorbent. The laminated fabric materials described in this patent include an air and water vapour-permeable fabric backing to which the aforesaid foam is bonded.

The adsorbent material in particulate form may be any solid particulate material capable of adsorbing the noxious chemicals. Such adsorbent materials are well known per se in the art and include, for example, silica gel and active clays of the attapulgite and bentonite classes, e.g. fuller's earth. A particularly preferred adsorbent material is activated carbon. It is critical that the organic binder, or for that matter, and other additives to the foam material do not contain substances which substantially deactivate the adsorbent. It is also desirable that the presence of the adsorbent in the foam material does not substantially reduce the permeability of the foam per se to air and water vapour.

As pointed out in the aforesaid Canadian Pat. No. 878,560, flexible foams do not per se possess high mechanical strength so that, for use in garments, it is the customary practice to bond, i.e. laminate, the foam, in known manner, to a fabric, such as a knitted or woven textile material, for example, nylon tricot, cotton sheeting, canton flannel, poplin, percale, etc. in order to provide a reinforced material. Instead of loose knit or woven fabrics, non woven fabrics such as netting or scrim may also be used to reinforce the foam. If the reinforcing fabric is also impregnated some additional resistance may be obtained in view of the additional adsorbent employed; however this effect is usually minimal. The fabric is essentially for mechanical reinforcement and is bonded to the foam by known lamination techniques such as flame lamination, adhesive lamination, stitch bonding and quilting.

In addition to substantially maintaining high permeability to water vapour and air, these laminates also substantially retain the flexibility of the foam material per se. Laminates of fabrics with foam materials for garment manufacture are well known in the art, but it is most surprising that impregnation of the foam material results in a fabric having an air and water vapour permeability which approaches that of the unimpregnated material. In certain cases, impregnation actually increases the air permeability for reasons which will be discussed more fully hereinafter.

Whilst polyurethurane foams such as those of the polyester or polyether type are the preferred foams, other foams may be impregnated with advantage, including cellulose, polystyrene and vinyl polymers. Foamed synthetic and natural rubbers are not particularly suitable as they may contain substances such as impurities, low molecular weight polymer, or processing additives in amounts large enough to saturate a significant part of the adsorption capacity of the adsorbent and therefore become less effective in adsorbing noxious chemicals although they can be treated according to the present invention with advantage. The thickness of the foam material can vary widely from about 1/16" or less up to several inches, depending upon the final use. Similarly density and cell size can vary over a wide range depending upon the porosity desired.

The activated carbon which is preferably used may be produced by heat treatment of vegetable matter, animal matter, coal, lignite, petroleum residues or synthetic organic polymers either with or without the addition of chemicals, and characterized by rapid and effective adsorption. Preferably the carbon should be finely divided to ensure even impregnation and maximum surface area. Preferably, the active carbon has an average particle size of about 5–15 microns. Finer grinding is of little advantage and it has been found that with coarse powder (circa 25 microns) the suspension settles too rapidly and an excessive amount of binder is required to prevent rubbing off. In order to provide clothing for adequate protection of the body against chemical warfare agents at least 5 milligrams of active carbon per square centimeter of foam are usually required. Up to about 12 milligrams of active carbon per square centimeter of foam can be present, without marked loss of porosity or flexibility to flexible foams. In less critical applications the presence of amounts less than 5 milligrams per square centimeter of foam may be quite satisfactory. The amount of active carbon present in the foam can be varied by adjusting the concentration of the carbon in the impregnating suspension or by repeating the impregnation of the foam two or even more times.

The active carbon is impregnated into the foam material by conventional impregnating techniques, such as immersion of the foam in a suspension of the active carbon in water or an organic solvent, such as ethyl alcohol. The choice of solvent is determined by the solubility characteristics of the foam. For example foamed polystyrene is soluble in benzene and as such benzene is unsuitable. Impregnation is followed by squeezing or pressing to remove excess liquid and drying to cure the binder incorporated with the active carbon in the suspension. When rigid foams are impregnated vacuum techniques to remove excess liquid may be employed.

The suspension may contain, in addition to the water or organic solvent and active carbon powder, a dispersing agent such as ammonium caseinate or the sodium salt of a styrene-maleic anhydride copolymer together with the organic binder necessary to hold the carbon in the cellular structure of the foam.

The organic binder may be of any type known to the carbon impregnating art (pigment binding art; powder binding art) and which does not contain substantial amounts of substances such as impurities, low molecular weight polymer processing additives and plasticizers which are adsorbed by activated carbon in amount sufficient to effect a substantial reduction of the adsorptive capacity of the activated carbon. Examples of water soluble binders include natural gums, cellulose and starch derivatives, salts of alginic acid and polymers of acrylic acid, acrylamide, vinyl alcohol and vinyl pyrrolidone. Examples of organic binders which are soluble in organic solvents but not soluble in water include cellulose esters, cellulose ethers, polymers and co-polymers of vinyl esters such as vinyl acetate, styrene, acrylic esters, methacrylic esters, butadiene, acrylonitrile and chloroprene; natural rubber and chlorinated rubber. Examples of water-insoluble binders used in the form of a dispersion in water often referred to as a latex include natural and synthetic rubbers, polymers, and co-polymers of vinyl esters vinyl acetals, acrylic esters, methacrylic esters, styrene, butadiene, acrylonitrile chloroprene, ethylene and propylene.

When water is used as the medium of the impregnation suspension it is usually desirable to add a dispersing agent to assist in dispersion of the activated carbon and prevent flocculation of dispersed activated carbon. When the binder is in the form of an aqueous dispersion of a water insoluble binder such as the latex form of natural rubber, polyethylacrylate or polyvinyl acetate it is desirable to add a stabilizing agent to the suspension of activated carbon in water before incorporating the binder, so as to prevent mutual flocculation of the activated carbon and the latex binder. It is believed that in the absence of such a stabilizing agent, the emulsifying and dispensing agents added during manufacture of a latex binder and which are essential for its stability are preferentially adsorbed by the activated carbon and the latex becomes so unstable as to flocculate. Substances have been found which function as dispersing agents as well as stabilizing agents, and examples of these include ammonium caseinate, the sodium salt of a co-polymer of styrene and maleic anhydride; the sodium salt of the condensation product of formaldehyde and naphthalene sulphonic acid; the sodium or ammonium salt of sulphonated lignin; the sodium salt of carboxymethyl cellulose; methylcellulose and polyvinyl pyrrolidone. Elastomeric binders such as natural rubber, synthetic rubbers and polyethylacrylate are preferred when flexibility is required, but when some rigidity is acceptable non-elastomeric binders such as polyvinyl acetate may be used. The amount of binder can vary quite widely between about 15 and 100 parts per 100 parts by weight of carbon; 25 parts per 100 parts of carbon being particularly satisfactory. Insufficient binder causes weak binding and hence excessive "rub off". Excess binder may impede the access of the noxious gases to the carbon thus reducing adsorption efficiency in addition to unnecessarily increasing the weight of the foam and reducing drape and flexibility.

In addition to the activated carbon, dispersion agents, stabilizing agents and binder, the impregnating suspension may also include high molecular weight water-soluble polymers such as carboxymethyl cellulose to inhibit settling of the activated carbon.

After impregnating the foam and drying, the impregnated foam may also be impregnated with a liquid repellent to impart thereto repellency to liquids. The foam may also be impregnated with an elemental carbon-free solution or dispersion of the binder to increase the resistance of the carbon dispersed in the foam to removal by mechanical action. The foam may also be impregnated with a suspension of pigment such as titanium dioxide or yellow iron oxide to cover or partly cover the black colour of the carbon, to effect camouflage colouring or reduce absorption of radiant heat.

In general, it is essential that the material such as the binder, dispersing agents, repellents, pigments added to the impregnating suspension together with the activated carbon, or applied in a second impregnation after the impregnation with active carbon, are free from substances which are adsorbed by the activated carbon and have the effect of reducing the useful adsorptive capacity of the activated carbon. However, the addition of materials which have an adverse effect upon the useful adsorptive capacity of the carbon may be acceptable, provided that the amount of such material in relation to the amount of activated carbon is not large enough to lower the useful adsorptive capacity of the carbon below that required for the use to which the impregnated foam is to be put. Thus in some uses, a loss of more than five percent of the adsorptive capacity of the carbon would not be acceptable; in other uses a loss of twenty percent of the adsorptive capacity of the carbon would be acceptable, when the use of a particular binder or other additive would confer desirable properties such as high flexibility, liquid repellency or resistance to burning.

Unfortunately the foam materials described in applicant's U.S. Pat. No. 4,045,609 and in his co-pending U.S. application Ser. No. 873,525, filed Jan. 30, 1978 now U.S. Pat. No. 4,153,745 have the disadvantage that they can be ignited easily and will burn, leaving a glowing residue which is difficult to extinguish.

Many substances are known and have been used to induce flame resistance when added to flammable materials. Among the more effective are organic substances containing nitrogen, halogen or phosphorus. However, all of these substances when applied to or incorporated in materials containing activated carbon are themselves adsorbed on the activated carbon. Further, many conventional flame retardant compositions contain auxiliary agents which are also adsorbed by activated carbon such as emulsifying, dispersing and wetting agents. When adsorbed on the carbon they occupy active sites and thus reduce the capacity of the carbon for further adsorption and degrade its protective capability.

It has now been found by applicant that this problem is solved by appropriate selection of the fire-proofing agent. The selection is based on the property of the flame retardant that it does not migrate into the adsorbent e.g. activated carbon and is adsorbed only to a limited extent such that the activity of the adsorbent is substantially unaffected; and is free from any substances which substantially de-activate the adsorbent.

Examples of flame-retardant chemicals which severely impair the gas adsorptive capacity of activated charcoal are tricresyl phosphate, tris(dibromopropyl)-phosphate, tetrakis hydroxy phosphonium chloride, and the halogenated biphenyls. The following examples illustrate this point.

According to the invention, an air and water vapour permeable open cell solid resin foam resistant to passage therethrough of noxious chemicals in liquid or vapour form is contemplated. The foam contains a particulate adsorbent material for said noxious chemicals dispersed therein, said particulate adsorbent material being bonded in said foam by an organic binder, and a fire-retarding agent impregnated therein, wherein said binder and said fire-retarding agent are substantially free from any substances which substantially de-activate the adsorbent.

It is therefore essential that the fire-proofing agent be substantially free from substances which substantially de-activate the adsorbent. It is further desirable that the presence of the fire-proofing agent does not substantially reduce the air and water vapour permeability of the foam.

Inorganic phosphates, such as ammonium ortho phosphate dibasic, ammonium orthophosphate monobasic, sodium orthophosphate dibasic, and calcium orthophosphate monbasic were found to be effective in retarding burning and suppressing afterglow. It is to be noted that these compounds are among the class of inorganic salts which are adsorbed on activated carbon only to a limited extent.

Organic substances which are insoluble, solid, and have very low vapour pressure and consequently cannot migrate into the pores of the activated carbon may also be used. Suitable polymeric materials may be included as part or whole of the binder for the activated carbon.

EXAMPLES

EXAMPLE 1

Polyurethane open-cell flexible foam laminated to a nylon tricot was impregnated with an aqueous dispersion of activated carbon by the method of Canadian Pat. No. 878,560 and dried. The dried carbon impregnated material was then impregnated by padding with an aqueous solution of ammonium orthophosphate, dibasic, and the material dried a second time.

EXAMPLE 2

The carbon impregnated material of Example 1 was impregnated by padding with an aqueous suspension of Phos-Chek ® P 30, an ammonium polyphosphate sold by Monsanto (Canada) Ltd, and then dried.

EXAMPLE 3

The ammonium polyphosphate Phos-Chek ® P 30 was added to the dispersion of activated carbon used to impregnate polyurethane open cell flexible foam laminated to a nylon tricot according to the method of Canadian Pat. No. 878,560 as in Example 1.

EXAMPLE 4

The carbon impregnated material of Example 1 was padded with an aqueous suspension of Flame-Snub Intermix 1010 a flame retardant sold at Arkansas Co. Inc. which contains tris dibromopropyl phosphate, and then dried.

The materials produced in Examples 1 to 4 were tested to determine their resistance to burning using a modification of Canadian Government Specifications Board Standard 4-GP-2 Method 27.1 in which the material under test was held vertically by its edges in a frame. They were also tested to determine the ability of the activated carbon to adsorb carbon tetrachloride vapour by the method of Canadian Forces Specification CF-C-611A para 4.3.1. Their properties are shown in Table I following:

TABLE I

| Example | Quantity of flame retardant added- Percent of fabric weight | Carbon Tetrachloride Adsorbed g/m$^2$ | Vertical Burning Test | | Char Length (cm) |
|---|---|---|---|---|---|
| | | | After-flame | After-glow | |
| 1 | 13.4 | 42.4 | None | None | 11 |
| 2 | 31.1 | 43.6 | None | None | 13 |
| 3 | 12.6 | 64.5 | 8 Seconds | None | 9 |
| 4 | 7.6 | 7.8 | None | None | — |
| Fabric without activated carbon | — | 7.5 | — | — | — |

Comparing the material of Example 4 with the base fabric before application of activated carbon it will be seen that they both show practically the same capacity to adsorb carbon tetrachloride. This shows that the flame retardant used in this Example completely eliminated the ability of the carbon to adsorb carbon tetrachloride vapour and the material of Example 4 is therefore quite useless as a gas protective clothing material. The materials of Examples 1, 2 and 3 all show much greater carbon tetrachloride absorption than the carbon-free base fabric showing that the flame retardant treatments did not impair the gas adsorptive capability of the carbon contained therein.

It is desirable that the basic foam material (before impregnation with activated carbon) be resistant to burning so that the flame retardant treatment is required only to control burning of the carbon impregnant. Again, any flame retardant chemicals used to achieve this must not migrate into the activated carbon. Fabric bonded to the foam is preferably made from inherently flame resistant fibre material such as polyacrylonitrile. Polyurethane foam is preferably made by reaction of an isocyanate with a polyol in which phosphorus, nitrogen or a halogen is part of the polyol molecule. Organic flame retardants which are not chemically reacted to form part of the chemical structure of the polyurethane can migrate into the activated carbon and are therefore unsuitable.

In view of the various embodiments described hereinabove, it should be apparent to those skilled in the art that the present invention may be embodied in forms other than those specifically described herein without departing from the spirit or central characteristics of the invention. Thus, the specific embodiments described above are to be considered in all respects as illustrative and not restrictive.

The embodiments of the invention in which an exclusive property or privilege is claimed are defined as follows:

1. An air and water vapour permeable open cell solid resin foam resistant to passage therethrough of noxious chemicals in liquid or vapour form, said foam containing a particulate adsorbent material for said noxious chemicals dispersed therein, said particulate adsorbent material being bonded in said foam by an organic binder, and a fire-retarding agent selected from the group consisting of ammonium orthophosphate dibasic, ammonium orthophosphate monobasic, sodium orthophosphate dibasic, ammonium polyphosphate and calcium orthophosphate monobasic impregnated therein, wherein said binder and said fire-retarding agent are substantially free from any substances which substantially de-activate the adsorbent.

2. A foam according to claim 1, which is a flexible foam.

3. A foam according to claim 2, wherein the foam is a polyurethane foam.

4. A foam according to claim 3, wherein the polyurethane foam is of the polyester type.

5. A foam according to claim 3 or 4, wherein the polyurethane foam is made by reaction of an isocyanate with a polyol in which phosphorus, nitrogen or a halogen is part of the polyol molecule.

6. A foam according to claim 1 or 2, wherein the foam is selected from the group consisting of foams of polystyrene, vinyl polymer, cellulose resin and polyether.

7. A foam according to claim 1, wherein the adsorbent material comprises activated carbon.

8. A foam according to claim 7, wherein the activated carbon has a particle size of about 5 to 15 microns.

9. A foam according to claim 8, wherein the activated carbon comprises about 5 to 12 mg/cm$^2$ of said foam.

10. A foam according to claim 9, wherein the organic binder is selected from the group consisting of natural rubber, synthetic rubbers, polyethylacrylate and polyvinylacetate.

11. A foam according to claim 10, wherein the amount of the binder in said foam is about 15 to 100 parts per 100 parts by weight of activated carbon.

12. A foam according to claim 11, bonded to an air and water vapour permeable fabric backing.

13. A foam according to claim 12, wherein the fabric is a knitted or woven fabric.

14. A foam according to claim 13, wherein the fabric is made from flame resistant fibre material.

15. A foam according to claim 12 or 13, where the fabric is made of polyacrylonitrile.

16. A laminated fabric material comprising an air and water vapour-permeable open cell solid resin foam resistant to passage therethrough of noxious chemicals in liquid or vapour form, said foam containing a particulate adsorbent material for the noxious chemicals dispersed therein, the particulate adsorbent material being bonded in said foam by an organic binder and a fire-retarding agent selected from the group consisting of ammonium orthophosphate dibasic, ammonium orthophosphate monobasic, sodium orthophosphate dibasic, ammonium polyphosphate and calcium orthophosphate monobasic impregnated therein, wherein said binder and said fire-retarding agent are substantially free from substances which would substantially deactivate said adsorbent material, and an air-and water vapour-permeable fabric backing to which the foam is bonded.

17. A laminated fabric material according to claim 16, wherein the fire-retarding agent is adsorbed on activated carbon only to a limited extent.

18. A laminated fabric material according to claim 16 or 17 wherein said fabric backing is made from a fire-resistant fibre material.

19. A laminated fabric according to claim 16 or 17 wherein the laminated fabric is in the form of a garment.

20. A laminated fabric according to claim 16, wherein said foam is a polyurethane foam.

* * * * *